US010055025B2

(12) United States Patent
Benni et al.

(10) Patent No.: US 10,055,025 B2
(45) Date of Patent: Aug. 21, 2018

(54) HUMAN-MACHINE DIALOG SYSTEM

(75) Inventors: Dominique Benni, Mornac (FR);
Francis Chauvet, Mouthiers (FR);
Alain Tardivon, Gourville (FR); Eric Lemasson, Anisy (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 1298 days.

(21) Appl. No.: 13/348,946

(22) Filed: Jan. 12, 2012

(65) Prior Publication Data
US 2012/0191458 A1 Jul. 26, 2012

(30) Foreign Application Priority Data

Jan. 24, 2011 (FR) ...................... 11 50511

(51) Int. Cl.
| | |
|---|---|
| G10L 11/00 | (2006.01) |
| G06F 3/02 | (2006.01) |
| H01H 73/30 | (2006.01) |
| H01H 50/60 | (2006.01) |

(52) U.S. Cl.
CPC ........... *G06F 3/0202* (2013.01); *H01H 50/60* (2013.01); *H01H 73/30* (2013.01); *H01H 2223/014* (2013.01)

(58) Field of Classification Search
CPC .. H01H 13/02; H01H 13/7065; G06F 9/4443; H04M 1/0237; H04M 1/233; H04M 1/236
USPC ........ 200/314, 341; 116/200, 205, 266, 273, 116/279
See application file for complete search history.

(56) References Cited

U.S. PATENT DOCUMENTS

| | | | | |
|---|---|---|---|---|
| 3,681,552 A | * | 8/1972 | Bailey ................... | H01H 13/02 200/280 |
| 5,249,654 A | * | 10/1993 | Bruning ................. | B60M 1/302 191/22 DM |
| 5,471,034 A | * | 11/1995 | Kawate ................ | B60H 1/2225 219/483 |
| 5,780,790 A | * | 7/1998 | Benson ..................... | B66B 3/00 187/395 |
| 5,865,546 A | | 2/1999 | Ganthier et al. | |
| 6,606,081 B1 | * | 8/2003 | Jaeger ................. | G06F 3/03545 345/108 |

(Continued)

OTHER PUBLICATIONS

French Preliminary Search Report and Written Opinion dated Aug. 10, 2011, in Patent Application No. FR 1150511, filed Jan. 24, 2011 (with English Translation of Category of Cited Documents).

(Continued)

*Primary Examiner* — Richemond Dorvil
*Assistant Examiner* — Mark Villena
(74) *Attorney, Agent, or Firm* — Oblon, McClelland, Maier & Neustadt, L.L.P.

(57) ABSTRACT

A human-machine dialog system including a first part including a data processing unit and an electrical power supply unit, a second part including a number of human-machine dialog members each provided with a human-machine dialog interface, and a fastening support arranged to accommodate each human-machine dialog member in a removable and interchangeable manner, and a communication and power supply bus linking the power supply unit and the processing unit of the first part to each human-machine dialog member.

15 Claims, 5 Drawing Sheets

(56) References Cited

U.S. PATENT DOCUMENTS

Figure 3:
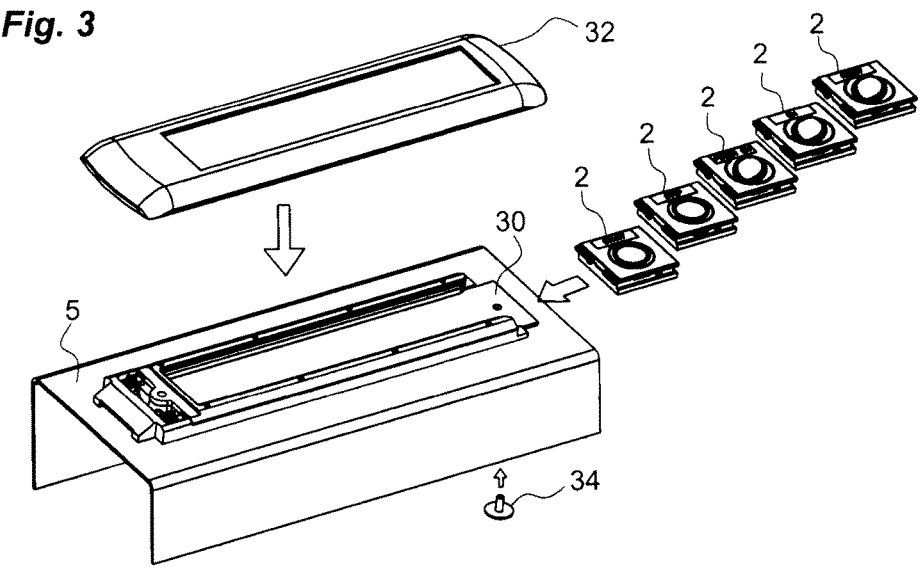

| | | | | | |
|---|---|---|---|---|---|
| 6,802,412 | B2* | 10/2004 | Lapeyre | ............... | B65G 47/844 198/370.02 |
| 7,416,039 | B1* | 8/2008 | Anderson | ................ | B60K 1/00 180/165 |
| 7,755,487 | B2* | 7/2010 | O'Hagan | ............. | H01Q 1/2216 235/375 |
| 2006/0050464 | A1 | 3/2006 | Von Arx et al. | | |
| 2006/0256090 | A1* | 11/2006 | Huppi | ..................... | A63F 13/02 345/173 |
| 2007/0060391 | A1* | 3/2007 | Ikeda | ..................... | A63F 13/06 463/46 |
| 2009/0176389 | A1* | 7/2009 | Wu | .......................... | H01R 4/64 439/95 |
| 2010/0026652 | A1* | 2/2010 | Hirshberg | ................ | A63F 13/06 345/173 |
| 2010/0224471 | A1* | 9/2010 | Sakai | ................ | H01H 13/7065 200/341 |
| 2011/0063230 | A1* | 3/2011 | Mazur | ................. | G10H 1/0091 345/173 |
| 2011/0170724 | A1* | 7/2011 | Lin | ........................ | B65H 75/48 381/332 |
| 2011/0181446 | A1* | 7/2011 | O'Donnell | ............. | H01H 13/76 341/22 |
| 2011/0216483 | A1* | 9/2011 | Vesely | ................... | B60N 3/004 361/679.01 |
| 2012/0032907 | A1* | 2/2012 | Koizumi | ............... | G06F 3/0414 345/173 |

OTHER PUBLICATIONS

Bernhard Linke, et al., "Sense multiple pushbuttons using only two wires", EDN Magazine, XP55004435, Sep. 9, 2010, URL:http://www.edn.com/article/510416-Sense-multiple_pushbuttons_using_only_two_wires.php, 2 pages.

* cited by examiner

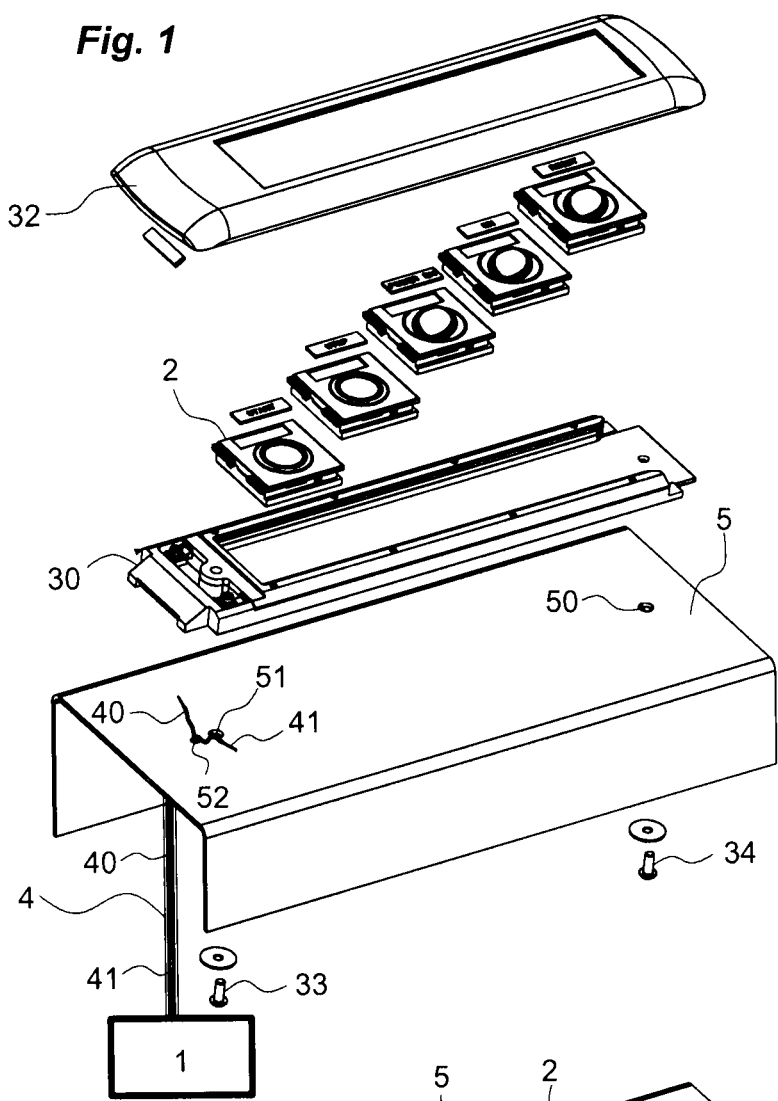
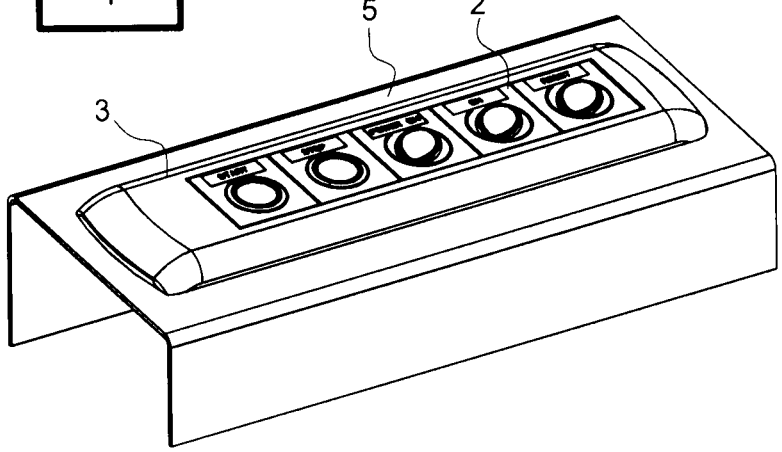

HUMAN-MACHINE DIALOG SYSTEM

The present invention relates to a human-machine dialog system. The invention relates specifically to a human-machine dialog system which comprises a first part and a second part that are interconnected.

Currently, a human-machine dialog system is produced by individually mounting each human-machine dialog member of the push-button or indicator lamp type on a door of an electrical enclosure or a control console. For each human-machine dialog member, it is necessary to drill a hole and to produce the wiring for this human-machine dialog member. If a human-machine dialog member has to be replaced, it has to be entirely dismantled and its replacement has to be rewired. The document U.S. Pat. No. 5,865,546 describes a modular keyboard employed in a computer system.

The document US 2006/050464 describes applications of the "One Wire" protocol.

The aim of the invention is to propose a human-machine dialog system that comprises a number of human-machine dialog members, which is easy to mount and in which each human-machine dialog member can easily be replaced.

This aim is achieved by a human-machine dialog system comprising:
  a first part including a data processing unit and an electrical power supply unit,
  a second part comprising a number of human-machine dialog members each provided with a human-machine dialog interface and a fastening support arranged to accommodate each human-machine dialog member in a removable and interchangeable manner,
  a communication and power supply bus linking the power supply unit and the processor unit of the first part to each human-machine dialog member, said communication and power supply bus comprising two parallel conductive rails arranged in the fastening support to connect each human-machine dialog member.

According to a particular feature, the system comprises a memory intended to store data representative of a state of the human-machine dialog member and processing means intended to read and/or write to said memory.

According to another particular feature, the human-machine dialog member comprises, for example, a control interface that can be actuated by a user and that cooperates with its processing means to write data representative of the state of the human-machine dialog member to the memory.

According to another particular feature, the human-machine dialog member comprises, for example, a signalling interface connected to the communication and power supply bus so as to be able to be powered by the power supply unit and that cooperates with its processor means to display a state corresponding to the data stored in the memory.

According to another particular feature, the human-machine dialog member comprises, for example, an identification or detection interface that cooperates with the processing means to write data representative of the state of the human-machine dialog member to the memory.

According to another particular feature, the human-machine dialog member comprises, for example, a data reception interface that operates by wireless technology and that cooperates with its processing means to write data representative of the state of the human-machine dialog member to the memory.

According to another particular feature, the human-machine dialog member comprises, for example, a data transmission interface that operates by wireless technology and that cooperates with its processing means to send a message corresponding to the data stored in the memory.

According to the invention, the human-machine dialog system comprises two human-machine dialog members each provided with a different human-machine dialog interface and these two human-machine dialog members both have an identical square-shaped housing.

According to another particular feature, the communication and power supply bus comprises a first conductive rail with non-zero electrical potential and a second conductive rail with neutral electrical potential both arranged along the fastening support.

According to another particular feature, the fastening support comprises an elongate base arranged to receive, by sliding, a number of human-machine dialog members.

According to the invention, the first part and the second part are positioned on either side of a wall, consisting, for example, of the door of an enclosure or the deck of a control console.

Figure 4:
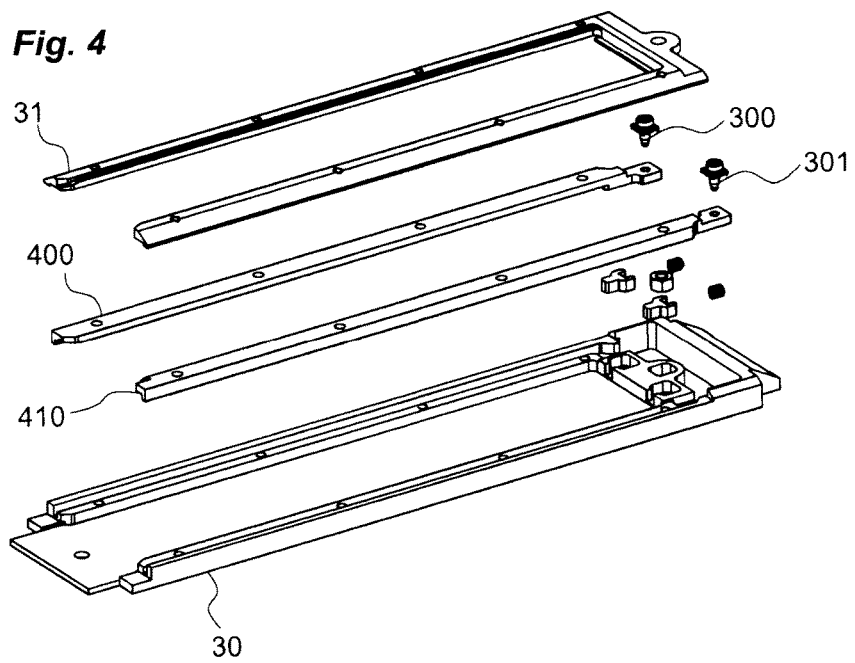
Figure 5:
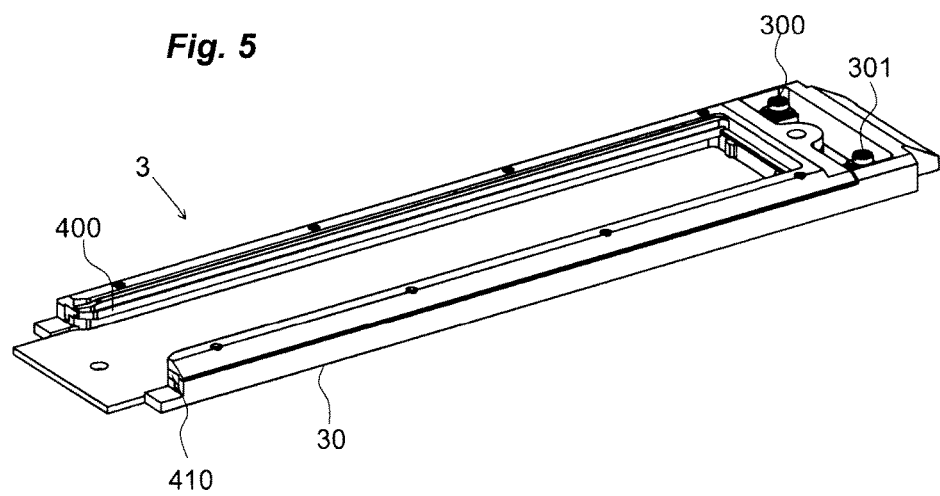
Figure 6:
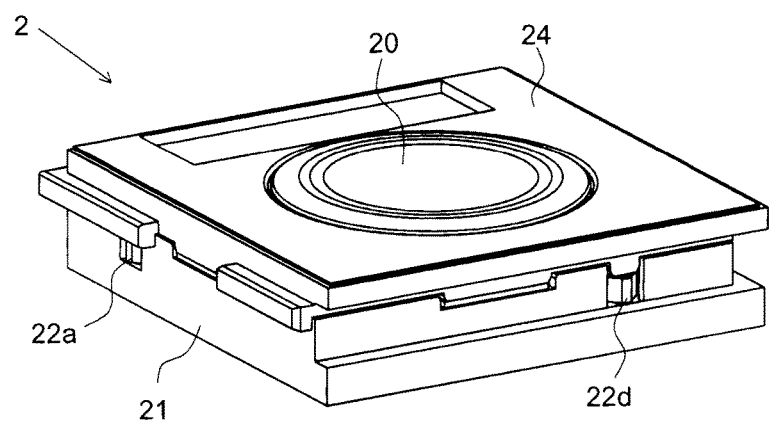
Figure 7:
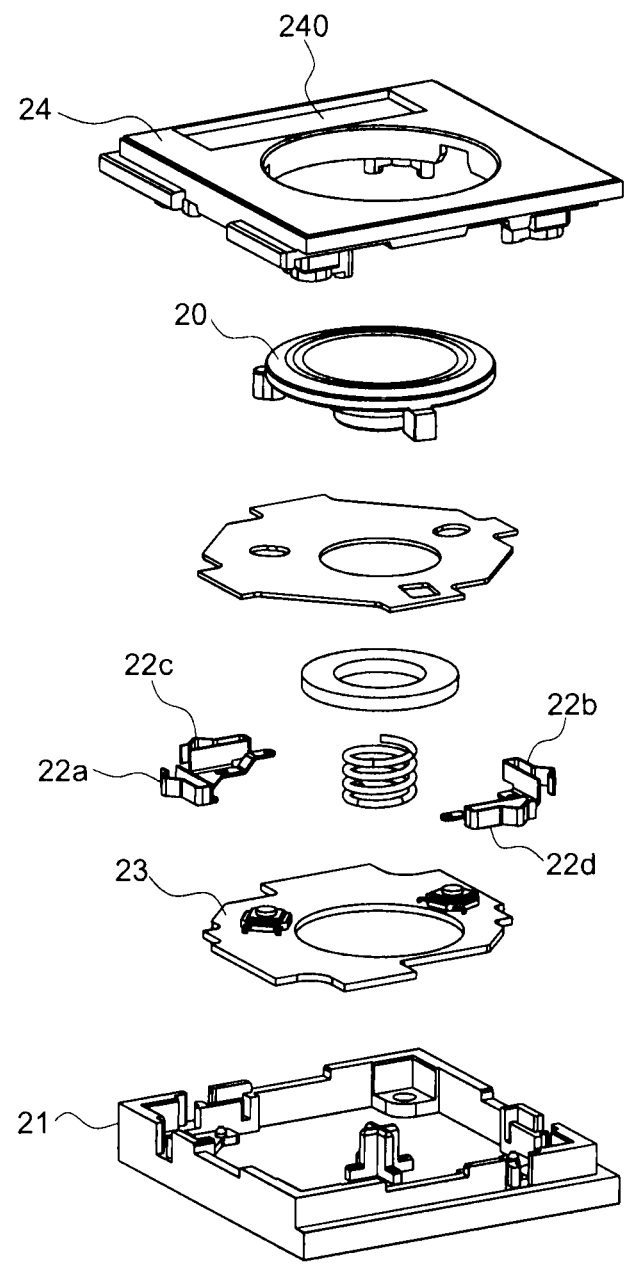
Figure 8:
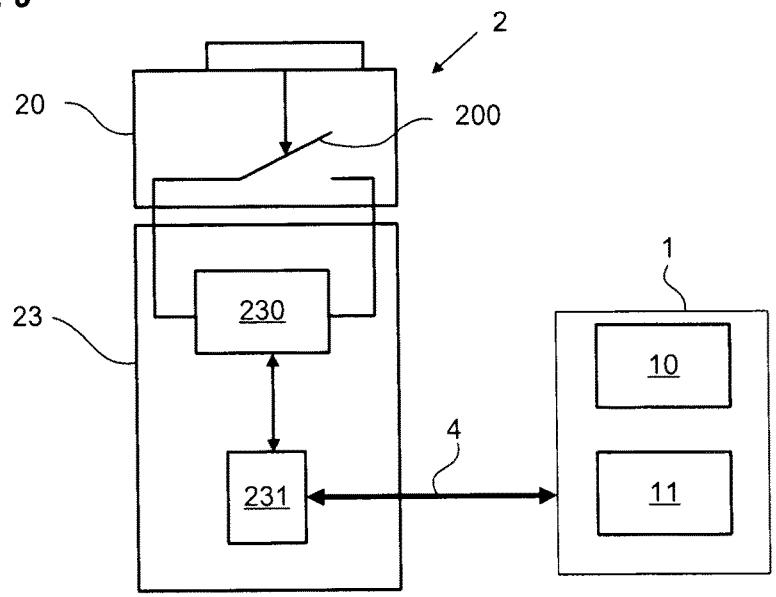
Figure 9:
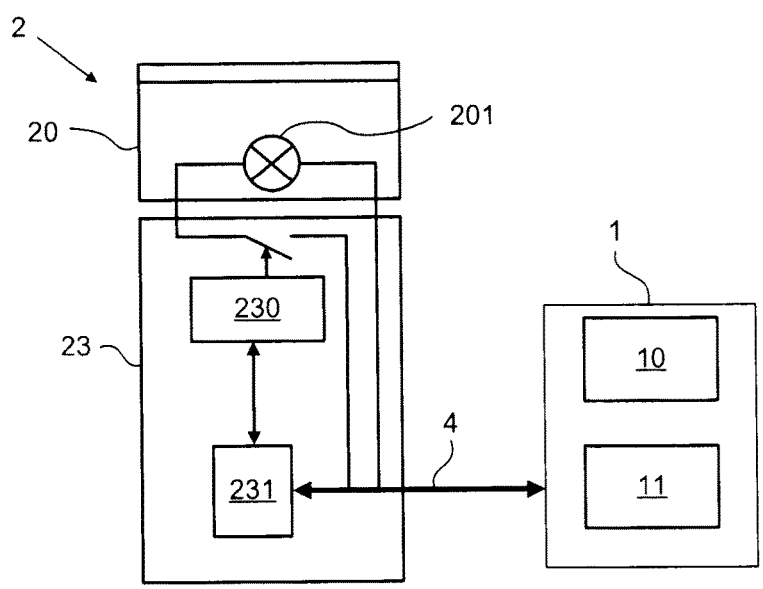

Other features and advantages will emerge from the following detailed description by referring to an embodiment given as an example and represented by the appended drawings in which:

FIG. 1 represents, in an exploded view, the human-machine dialog system of the invention, FIG. 2 represents the human-machine dialog system of the invention, FIG. 3 illustrates the principle of assembly of the human-machine dialog system of the invention, FIG. 4 represents, in an exploded view, the fastening support for the second part of the human-machine dialog system of the invention, FIG. 5 represents, in an assembled view, the fastening support for the second part of the human-machine dialog system of the invention, FIG. 6 represents a human-machine dialog member provided with a push-button-type control interface suitable for the human-machine dialog system of the invention, FIG. 7 represents, in an exploded view, the human-machine dialog member provided with a push-button-type control interface suitable for the human-machine dialog system of the invention, FIG. 8 schematically represents the operating architecture of a human-machine dialog member provided with a push-button-type control interface, FIG. 9 schematically represents the operating architecture of a human-machine dialog member provided with a signal light-type signalling interface.

The invention relates to a human-machine dialog system notably comprising a first part 1 comprising a station 10 for reading/writing data and a second part comprising a number of human-machine dialog members 2 each provided with a human-machine dialog interface 20, processing means 230 and, for example, a memory 231.

According to the invention, the first part 1 comprises a station 10 for reading/writing data provided with a processing unit including a microprocessor and a memory and a power supply unit 11 intended to power the human-machine dialog members 2 of the second part. The reading/writing station 10 and the power supply unit 11 are, for example, arranged inside one and the same housing comprising fastening means suited to the type of application. The first part 1 is shown once in FIG. 1 but it should be considered that it is also present in the same configuration in the other appended figures. According to the invention, the memory of the processing unit can be shared by all the human-machine dialog members in order to store their state or other information assigned to the human-machine dialog member. As described above, it is also possible to assign a distinct memory 231 to each human-machine dialog member. Hereinafter in the description, we will assume that each human-machine dialog member 2 has its own memory 231. However, the overall configuration of the system is such that it is possible to imagine that the memory employed is common to all the human-machine dialog members and corresponds, for example, to the memory of the reading/writing station or to one or more other memories located in the first or the second part of the human-machine dialog system.

The first part 1 and the second part are interconnected via a communication and power supply bus 4 enabling the communication between the reading/writing station 10 and each human-machine dialog member 2 and the power supply between the power supply unit 11 and the human-machine dialog members 2. This communication and power supply bus 4 is, for example, implemented on two distinct conductive lines, a first conductive line 40 connected to a non-zero electrical potential and allowing for the passage of both the power supply current for the human-machine dialog members 2 and the communication frames exchanged between the reading/writing station 10 and the human-machine dialog members 2, and a second conductive line 41 with neutral electrical potential.

The reading-writing station 10 and the different human-machine dialog members 2 exchange data over the communication and power supply bus 4 by employing a simple communication protocol. This communication protocol is, for example, a two-wire protocol allowing for the passage of both the power supply for the human-machine dialog members and the communication frames exchanged between each human-machine dialog member 2 and the reading/writing station 10. A protocol of this type that is already known is the one called "OneWire" (also called DALLAS protocol).

According to the invention, whatever their function, the human-machine dialog members 2 all have an identically-shaped housing, enabling them to be interchangeable.

According to the invention, a human-machine dialog member 2 as employed in the system of the invention consists of a square-shaped housing 21, made of a plastic material for example, at least two electrical contacts 22a, 22b produced on the outside of the housing 21, a printed circuit 23 mounted inside the housing and a front panel 24 sealing the housing and accommodating a human-machine dialog interface such as, for example, a control interface 20 of push-button type (FIGS. 6 and 7). The two electrical contacts 22a, 22b are produced on at least two opposing sides of the housing. Preferentially, two other electrical contacts 22c, 22d are also produced on the other two opposing sides of the housing. In this way, each human-machine dialog member 2 has two distinct connection interfaces enabling it to be able to assume two distinct orientations mutually offset by 90°. Moreover, the front panel 24 includes a placement 240 intended to receive a label.

A human-machine dialog member 2 comprises processing means 230, such as a microprocessor and a memory 231 intended to store data representative of a state of the human-machine dialog member or representative of a message received or to be sent by the human-machine dialog member 2. The processing means 230 and the memory 231 are assembled on the printed circuit 23 and connected to the electrical contacts 22a-22d produced on the housing 21 and are both intended to be powered by the power supply unit 11 via the communication and power supply bus 4.

The memory 231 of the human-machine dialog member 2 is, as an indication, a RAM, EEPROM or FERAM technology memory and notably stores a unique identifier identifying the human-machine dialog member on the communication network created between the reading/writing station 10 and the human-machine dialog members and data representative of the state of the human-machine dialog member 2 with which this memory is associated. The memory 231 may also store data relating to the type of human-machine dialog interface 20.

According to the invention, the expression "human-machine dialog interface 20" should be understood to mean any control interface that can be actuated manually or by an external element and that can be actuated directly or remotely by wired or wireless link. This therefore includes, for example, the different types of buttons such as push-button, rotating knob with at least two positions but also position sensors, other types of control interfaces such as touchscreens or data reception interfaces based on wireless technology (radio, infrared, etc.) remotely controlled by a wireless control device.

The expression "human-machine dialog interface 20" should also be understood to mean any visual or audible signalling interface, coupled or not coupled to a control interface. This therefore includes, for example, signal lights, luminous labels or display screens, and all sound warning devices. The signalling interface may also consist of a data transmission interface based on wireless technology enabling a message to be sent to a remote receiver.

The expression "human-machine dialog interface 20" should also be understood to mean any detection or identification interface coupled or not coupled to a signalling interface or to a control interface as defined above. This therefore includes, for example, any presence sensor of capacitive, inductive or resistive type, and any sensor of biometric type that can be used to identify a person.

Hereinafter in the description, it should be understood that the human-machine dialog member 2 may itself comprise a number of different human-machine dialog interfaces 20 as described above. Thus, one and the same human-machine dialog member 2 may comprise both a control interface such as, for example, a push-button, and a signalling interface such as, for example, a signal light.

Depending on the type of human-machine dialog interface 20 employed, the configuration of the human-machine dialog member 2 may vary. Actually, with reference to FIG. 8, a human-machine dialog interface 20 of push-button type comprises, for example, a contact 200, the state of which is permanently monitored by the processing means 230 of the human-machine dialog member. When this contact 200 changes state, the processing means 230 write data representative of this state to the internal memory 231. The reading/writing station 10, which scans the memory 231 at regular intervals, can then be informed of the change of state of the human-machine dialog interface 20.

Referring to FIG. 9, a human-machine dialog interface 20 of signal light type comprises, for example, a light-emitting diode 201 that can be powered by the power supply unit 11. When the station 10 orders the illumination of the light it writes to the internal memory 231 of the human-machine dialog member 2 data representative of the state that it wants to give the signal light, for example data representative of the "on" state of the light. The processing means 230 of the human-machine dialog member which read the memory 231 detect the change of state and control the actuation of a contact to connect the diode 201 to the power supply unit 11 via the communication and power supply bus 4.

According to the invention, since the memory 231 included in each human-machine dialog member is optional, it should be understood that the information to be memorized can be stored in another memory, for example common to all the human-machine dialog members and located in the first or the second part of the human-machine dialog system.

According to the invention, the second part of the system comprises a fastening support 3 capable of accommodating, in a removable and interchangeable manner, one or more human-machine dialog members 2 of the type described above. The fastening support 3 comprises two parallel conductive rails 400, 410 in extension of the conductive lines 40, 41 and to which can be connected each human-machine dialog member 2 via its electrical contacts 22a-22d. The communication and power supply bus 4 therefore consists of the two conductive lines 40, 41 extending between the first part 1 and the second part and the two conductive rails 400, 410 of the fastening support 3.

Referring to FIGS. 4 and 5, this fastening support 3 also comprises a base 30 or plate of elongate form comprising a first end having two electrical terminals 300, 301 each connected to a conductive rail 400, 410 fixed to the base 30 and extending in the longitudinal direction, and a covering element 31 fastened to the base 30 and forming two parallel slideways on which the human-machine dialog members 2 can be threaded, one after the other, by sliding, via a second open end of the base 30. A fastening support 3 as represented in the appended figures can, for example, accommodate five human-machine dialog members 2. The fastening support 3 also comprises a covering plate 32 (not represented in FIG. 5 but visible in FIG. 3) that is superposed on the base 30 and is used to fasten the human-machine dialog members 2 in the fastening support 3 by sealing the second end of the base 30. This covering plate 32 is arranged on the base 30 so as to cover the conductive rails, thus preventing any contact with conductive parts.

Based on the various elements described above, the invention therefore consists in producing a human-machine dialog system by connecting the first part 1 to the second part with the communication and power supply bus 4. The invention applies notably to the human-machine dialog systems which may be positioned on the door of an enclosure or on a control console. The system of the invention can thus replace the buttons or lights each individually mounted on the door of the enclosure or on the control console. In the appended figures, the door of the enclosure or the control console are both represented in the form of a simple wall 5.

According to the invention, the first part 1 formed by the station 10 and the power supply unit 11 is thus positioned inside the enclosure, by being, for example, fastened to a DIN rail, or under the control console, and the second part comprising the fastening support 3 and the human-machine dialog members 2 is fastened on the outside of the wall 5 formed by the door of the enclosure or the control console.

Referring to FIGS. 1, 3 and 4, the fastening support 3 comprises, for example, two fastening members, for example two screws 33, 34. Each screw 33, 34 is intended to pass through an orifice 50, 51 formed through the wall 5. Another orifice 52 must also be formed through the wall 5 to allow for the passage of the two conductive lines 40, 41 of the communication and power supply bus 4 connected on the one hand to the two terminals 300, 301 of the fastening support 3 and on the other hand to the reading/writing station 10 and to the power supply unit 11. According to the invention, only three orifices 50, 51, 52 of small diameter are enough to fasten the fastening support 3 through the wall 5 and connect it to the reading/writing station 10 and to the power supply unit 11, the support 3 itself being able to accommodate a number of human-machine dialog members 2. This configuration of the invention therefore offers the advantage of minimizing the number of orifices to be drilled through the wall 5. Since the human-machine dialog members 2 comprise two distinct connection interfaces, offset by 90°, the fastening support 3 can be fixed horizontally or vertically to the wall 5. Other means for fastening the fastening support can be envisaged, employing, for example, a self-adhesive part or a magnetized part produced under the fastening support 3.

When the human-machine dialog system is started up, the unique identifier of each human-machine dialog member 2 is learned by the reading/writing station 10 in a preliminary learning step and is associated in the memory of the reading/writing station 10 with the type of human-machine dialog interface 20 of the human-machine dialog member 2. The station 10 then configures its inputs-outputs according to the type of human-machine dialog interface 20 to be addressed.

The system of the invention therefore offers a certain number of advantages, some of which are listed below:
reduction in the number of holes to be drilled through the wall,
possibility of configuring the system, even after fastening the support,
possibility of modifying the system at any time by removing, by adding or by swapping human-machine dialog members,
limited wiring because it is no longer necessary to individually wire each human-machine dialog member,
possibility of incorporating the system in a network by directly connecting the station to the network,
modularity of the system and wealth of functions offered,
compactness of the system, notably depthwise, compared to the conventional solutions, etc.

Obviously, it is possible, without departing from the scope of the invention, to imagine other variants and refinements of detail and even envisage the use of equivalent means.

The invention claimed is:
1. A human-machine dialog system comprising:
a first part including a data processing unit and an electrical power supply unit;
a second part including a plurality of human-machine dialog members each provided with a human-machine dialog interface, and a fastening support arranged to accommodate each human-machine dialog member in a removable and interchangeable manner; and
a communication and power supply bus linking the power supply unit and the processing unit of the first part to each human-machine dialog member, said communication and power supply bus including two conductive lines extending through one orifice in a wall to two parallel conductive rails arranged in the fastening support to connect each human-machine dialog member, the plurality of human-machine dialog members being arranged in an adjacent fashion one after the other by sliding on the two parallel conductive rails such that the plurality of human-machine dialog members are located between the two parallel conductive rails, wherein
the first part is positioned on a first side of the wall and the second part is positioned on a second side of the wall, the first part and the second part being connected to each other via the two conductive lines, the two conductive lines both extending through the one orifice in the wall, which separates the first part and the second part, to the two parallel conductive rails that are arranged in the fastening support included in the second part, and the wall includes the one orifice, through which both of the two conductive lines extend, a second orifice located at a first end of the wall and configured to receive a first fastening member, and a third orifice located at a second end of the wall and configured to receive a second fastening member.

2. The human-machine dialog system according to claim 1, further comprising:

a memory to store data representative of a state of a human-machine dialog member of the plurality of human-machine dialog members; and processing means to read and/or write to said memory.

3. The human-machine dialog system according to claim 2, wherein the human-machine dialog member comprises a control interface configured to be actuated by a user and that cooperates with its processing means to write data representative of the state of the human-machine dialog member to the memory.

4. The human-machine dialog system according to claim 2, wherein the human-machine dialog member comprises a signaling interface connected to the communication and power supply bus so as to be powered by the power supply unit and cooperates with its processing means to display a state corresponding to the data stored in the memory.

5. The human-machine dialog system according to claim 2, wherein the human-machine dialog member comprises an identification or detection interface that cooperates with the processing means to write data representative of the state of the human-machine dialog member to the memory.

6. The human-machine dialog system according to claim 2, wherein the human-machine dialog member comprises a data reception interface that operates by wireless technology and that cooperates with its processing means to write data representative of the state of the human-machine dialog member to the memory.

7. The human-machine dialog system according to claim 2, wherein the human-machine dialog member comprises a data transmission interface that operates by wireless technology and that cooperates with its processing means to send a message corresponding to the data stored in the memory.

8. The human-machine dialog system according to claim 1, wherein the plurality of human-machine dialog members includes two human-machine dialog members each provided with a different human-machine dialog interface, the two human-machine dialog members both having an identical square-shaped housing.

9. The human-machine dialog system according to claim 1, wherein the two conductive rails include a first conductive rail with non-zero electrical potential and a second conductive rail with neutral electrical potential both arranged along the fastening support.

10. The human-machine dialog system according to claim 9, wherein the fastening support comprises an elongate base arranged to receive, by the sliding, the plurality of human-machine dialog members and to which are fastened the first and second conductive rails.

11. The human-machine dialog system according to claim 1, wherein the one orifice in the wall through which the two conductive lines extend to the two parallel conductive rails is located adjacent to one end of the wall.

12. A human-machine dialog system comprising:

a first part including processing circuitry and a power supply;

a second part including a plurality of human-machine dialog members each provided with a human-machine dialog interface, and a fastening support arranged to accommodate each human-machine dialog member in a removable and interchangeable manner; and a communication and power supply bus linking the power supply and the processing circuitry of the first part to each human-machine dialog member, said communication and power supply bus including two conductive lines extending through one orifice in a wall to two parallel conductive rails arranged in the fastening support to connect each human-machine dialog member, the plurality of human-machine dialog members being arranged in an adjacent fashion one after the other by sliding on the two parallel conductive rails such that the plurality of human-machine dialog members are located between the two parallel conductive rails, wherein the first part is positioned on a first side of the wall and the second part is positioned on a second side of the wall, the first part and the second part being connected to each other via the two conductive lines the two conductive lines both extending through the one orifice in the wall, which separates the first part and the second part, to the two parallel conductive rails that are arranged in the fastening support included in the second part.

13. The human-machine dialog system according to claim 12, wherein the fastening support comprises a base that includes a first end and a second end, the first end of the base includes two electrical terminals each connected to a conductive rail of the two parallel conductive rails, and the base is arranged to receive via the second end of the base, by the sliding, each human-machine dialog member.

14. The human-machine dialog system according to claim 13, wherein a position of the first end of the base corresponds to a position of the one orifice in the wall through which the two conductive lines extend to the two parallel conductive rails.

15. The human-machine dialog system according to claim 12, wherein the wall includes the one orifice, through which both of the two conductive lines extend, a second orifice located at a first end of the wall adjacent to the one orifice and configured to receive a first fastening member that fastens the fastening support to the second part, and a third orifice located at a second end of the wall, opposite the second orifice and the one orifice which are adjacent to each other, and configured to receive a second fastening member that fastens the fastening support to the second part.

* * * * *